US012685308B1

(12) United States Patent
Palmer, Jr. et al.

(10) Patent No.: US 12,685,308 B1
(45) Date of Patent: Jul. 21, 2026

(54) DRIFT CONTROL ADDITIVE

(71) Applicant: Ethox Chemicals, LLC, Greenville, SC (US)

(72) Inventors: Charles F. Palmer, Jr., Greenville, SC (US); Ronald A. Bingeman, Greenville, SC (US); William C. Floyd, III, Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 236 days.

(21) Appl. No.: 18/415,170

(22) Filed: Jan. 17, 2024

Related U.S. Application Data

(62) Division of application No. 15/680,944, filed on Aug. 18, 2017, now Pat. No. 12,133,526.

(60) Provisional application No. 62/377,299, filed on Aug. 19, 2016.

(51) Int. Cl.
*A01N 25/30* (2006.01)
*A01N 25/06* (2006.01)

(52) U.S. Cl.
CPC ............. *A01N 25/30* (2013.01); *A01N 25/06* (2013.01)

(58) Field of Classification Search
CPC ................................ A01N 25/30; A01N 25/06
See application file for complete search history.

(56) References Cited

U.S. PATENT DOCUMENTS

| | | | |
|---|---|---|---|
| 3,776,857 | A | 12/1973 | Linder |
| 4,203,877 | A | 5/1980 | Baker |
| 6,103,770 | A | 8/2000 | Trouve |
| 6,479,442 | B1 | 11/2002 | Berube et al. |
| 6,765,024 | B1 | 7/2004 | Gray et al. |
| 6,797,673 | B1 | 9/2004 | Worthley et al. |
| 8,431,518 | B2 | 4/2013 | Brooker et al. |
| 8,501,208 | B2 | 8/2013 | Wilson et al. |
| 8,993,503 | B2 | 3/2015 | Keuleers et al. |
| 9,107,410 | B2 | 8/2015 | Crouse et al. |
| 9,107,413 | B2 | 8/2015 | Crouse et al. |
| 9,272,165 | B2 | 3/2016 | Poletti |
| 9,315,621 | B2 | 4/2016 | Chen et al. |
| 9,428,630 | B2 | 8/2016 | Sexton et al. |
| 9,596,846 | B2 | 3/2017 | Goyal et al. |
| 9,663,431 | B2 | 5/2017 | Griese et al. |
| 9,743,655 | B2 | 8/2017 | Hillger et al. |
| 9,884,016 | B2 | 2/2018 | Huang |
| 9,957,467 | B2 | 5/2018 | Di Capua et al. |
| 10,039,279 | B2 | 8/2018 | Wilson et al. |
| 10,059,909 | B2 | 8/2018 | Scheibel et al. |
| 2010/0113275 | A1 | 5/2010 | Qin et al. |
| 2016/0192642 | A1 | 7/2016 | Lindner et al. |
| 2016/0278370 | A1 | 9/2016 | Qin et al. |
| 2018/0125064 | A1 | 5/2018 | Lindner et al. |

FOREIGN PATENT DOCUMENTS

| | | |
|---|---|---|
| WO | WO 2010/051435 | 5/2010 |
| WO | WO 2011/116049 | 9/2011 |
| WO | WO 2016/182991 | 11/2016 |
| WO | WO 2018/005340 | 1/2018 |

*Primary Examiner* — Mina Haghighatian
(74) *Attorney, Agent, or Firm* — Thrive IP®; Jeremy M. Stipkala

(57) ABSTRACT

Provided is a drift control additive comprising a fatty acid terminated ethoxylated polyol, an oil and an ethoxylated fatty acid.

11 Claims, No Drawings

DRIFT CONTROL ADDITIVE

CROSS-REFERENCE TO RELATED APPLICATIONS

The present application is a divisional application of pending U.S. patent application Ser. No. 15/680,944 filed Aug. 18, 2017 which, in turn, claims priority to U.S. Provisional Application No. 62/377,299 filed Aug. 19, 2016 both of which are incorporated herein by reference.

FIELD OF THE INVENTION

The present invention is related to a combination of polymeric and nonpolymeric surfactants which function synergistically to provide improved droplet formation for sprayed crop chemicals.

BACKGROUND

A current challenge in agriculture is spraying herbicides, insecticides, fungicides, fertilizers and the like in a specific desired location, without significant portions of the spray cloud drifting into nontargeted areas. This is generally achieved by controlling the size of the droplets in the cloud as larger droplets are less prone to drift. It is generally desirable that the droplets are at least 150 μm in diameter.

One mechanism for achieving larger droplet size is to introduce a small amount, such as about 0.1-1%, of a dispersed emulsion into the solution. The dispersed emulsion is believed to control the rupturing mechanism of spray droplets in such a way as to prevent the formation of fine mists. While the use of these emulsions has been known and practiced since the 1970's, all previous formulations have had drawbacks such as poor stability in tank mixes, poor performance with certain nozzle types, and a generally poor efficiency at reducing fine droplets to acceptable levels.

Alan S. Baker reported polymeric emulsifiers comprising ethoxylated polyols esterified with 12-hydroxystearic acid in U.S. Pat. No. 4,203,877 which is incorporated herein by reference. While this information was largely used for the production of linear polyethylene oxide and 12-hydroxystearic acid copolymers, the branched polymers described therein have also been found to be useful, in particular, due to their desirable property of being liquids at room temperature due to the branching effects of the polymer. In spite of the advance, the formulation still provides an unacceptably high level of fine droplets and therefore the effectiveness is limited.

There is an ongoing desire in the art for improvements in crop spray, and more specifically, improvements in surfactants used for crop spray wherein the propensity for fine droplets is decreased thereby limiting the drift of sprayed crop chemicals.

SUMMARY OF THE INVENTION

The present invention is related to an improved mixture of surfactants which is particularly suitable for use in crop sprays as a drift control additive.

More specifically, the present invention is related to a drift control additive which minimizes fine droplet formation thereby minimizing the drift of sprayed herbicides, insecticides, fungicides, fertilizers and the like.

A particular feature of the invention is the ability to include the drift control additive in small portions relative to the composition of the spray.

These and other embodiments, as will be realized, are provided in a drift control additive comprising a fatty acid terminated ethoxylated polyol, an oil, and an ethoxylated fatty acid.

Yet another embodiment is provided in an aerosol for spraying crops comprising an active component, a fatty acid terminated ethoxylated polyol, an oil, and an ethoxylated fatty acid.

DESCRIPTION

The present invention is related to a specific combination of polymeric and nonpolymeric surfactants which function synergistically for controlling the droplet sizes of aqueous solutions thereby allowing for the production of improved spray drift formulations for delivery of crop treatment formulations comprising an active component, such as herbicides, insecticides, fungicides, fertilizers and the like. This combination of surfactants can be used at low dosage levels to reduce the percentage of driftable fine droplets in an aerosol beyond what is currently capable in the art.

The present invention utilizes three components as the drift control additive. The first component is a polymeric emulsifier which is a fatty acid terminated ethoxylated polyol, preferably poly(12-hydroxystearic acid) terminated ethoxylated glycol. The second component is an oil, more preferably a triglyceride, and most preferably soybean oil. The third component is ethoxylated fatty acid, preferably ethoxylated oleic acid.

The polymeric emulsifier of the instant invention is constructed of a combination of a hydrophilic inner core with an outer layer of hydrophobic moieties. The outer hydrophobic moieties are connected to the ends of the inner core and to each other by way of hydrophilic connecting chains. These hydrophilic chains may have multiple branches so that the three-dimensional structure of the polymeric emulsifier is more-or-less star shaped or dendrimeric. Preferred hydrophilic inner cores are not linear, but have more than two branches out to a hydrophobic end moiety. Most preferred is a tribranched hydrophilic core such as provided by ethoxylated glycerin.

The outer layer of hydrophobic moieties may comprise any number of hydrophobic oligomeric or polymeric groups. These may include polyesters such as poly(12-hydroxystearic acid) or other polymerized fatty acids, polyethers, poly(meth)acrylates, or esters of fatty acids or large hydrocarbons. The outer hydrophobic layer of the polymeric emulsifier may contain a small proportion of hydrophilic groups such as phosphate esters, sulfates, sulfonates, amines, or carboxylates.

The inner hydrophilic core of the polymeric emulsifier of the instant invention is most conveniently formed from the ethoxylation of a polyol to form an ethoxylated polyol. The ethoxylated polyol may have at least two to no more than twelve hydroxyl end groups, preferably at least three to no more than six hydroxyl groups, and most preferably three hydroxyl groups. There is no set limitation on the number of ethyleneoxy groups for the invention. More ethyleneoxy groups increases the hydrophilicity of the core and increases the hydrophile/lipophile balance (HLB) of the polymeric emulsifier. The inner core may include a small amount of hydrophobic moiety such as propylene oxide groups or alkyl groups derived from the polyol. The inner core may also include some anionic groups such as phosphate esters, sulfates, sulfonates, or carboxylates in small proportions. These groups markedly increase the HLB of the polymeric emulsifier. Different HLBs will be realized with different combinations of hydrophilic cores and hydrophobic outer layers.

Branched ethoxylated polyols and particularly glycerin ethoxylates are preferred over linear polymers. Linear hydrophilic polymers such as polyethylene oxide have a tendency to be solids at ambient temperatures when the chain length exceeds about 600 amu. At useful chain lengths for incorporation into the polymeric emulsifiers of the instant invention, above 600 amu, the tendency of a linear inner core to solidify can cause the entire emulsifier to solidify at ambient temperatures. Branched hydrophilic core polymers are useful, in particular due to their desirable property of being liquids at room temperature due to the branching effects of the polymer. While multiple-branched electrophiles may be used as initiators for these hydrophilic cores, glycerol appears to give superior results to those obtained through more highly branched systems.

A particularly preferred polyol is glycerin ethoxylate containing about twelve to about twenty-five moles of ethylene oxide per mole of glycerin with the ethoxylate terminated by the condensation reaction with hydroxystearic acid. More preferably, the polyol is glycerin ethoxylate with twelve to twenty moles of ethylene oxide per mole of glycerin. Even more preferably, the polyol is glycerin ethoxylate with fifteen to nineteen moles of ethylene oxide per mole with seventeen moles of ethylene oxide being particularly preferred. While not limited thereto, it is hypothesized that the ethoxylate is approximately statistically distributed, with one ethoxylate branch for each of the hydroxyl groups in the polyol, and each ethoxylate branch is terminated with the product of the condensation reaction with fatty acid.

It is preferred to have a stoichiometric excess of fatty acid thereby providing for branching and enlarging of the hydrophobic portion of the surfactant. While not limited to theory, it is hypothesized that fatty acid terminates a majority of the ethoxylate groups, referred to herein as terminating fatty acids, and the stoichiometric excess reacts with the secondary alcohols on the terminating fatty acids thereby forming branching fatty acids. With ethoxylated glycerol, and therefore three ethoxylate branches, it is preferable to have at least five to no more than twelve moles of fatty acid, particularly 12-hydroxystearic acid, thereby providing, on average, at least about two hydrophobic branches per molecule to about nine hydrophobic branches per molecule. The fatty acid may be used as a monomer or added as a dimer or oligomer with a preference for addition as a monomer.

Suitable oils include triglycerides of natural and synthetic fatty acids, methyl esters of fatty acids, and mineral and other hydrocarbon oils. The oil can be either naphthenic or paraffinic. Triglycerides are preferred due to their improved biodegradability in agricultural applications. Vegetable oils, such as soybean oil and modified soybean oil, are particularly preferred.

One or more co-surfactants may be combined with the polymeric emulsifier and the oil to improve the drift control characteristics. These co-surfactants may include any of several types of surfactant including alcohol ethoxylates, ethoxylated fatty acids, fatty acid amides, phosphate esters, sulfates, sulfonates, carboxylates, amine ethoxylates, ethoxylated glycerides, and amphoterics. The co-surfactant must be compatible with the polymeric emulsifier and with the oil.

Ethoxylated oleic acid is the preferred ethoxylated fatty acid with about four to ten moles of ethyleneoxy groups, more preferably six to eight moles of ethyleneoxy groups, and most preferably about seven.

While not limited to theory, the altered branching and crowding effects introduced from a polymer with three branches instead of, for example, four to eight branches is believed to be synergistic with the nonpolymeric emulsifier such as an ethoxylated oleic acid, thereby improving the performance characteristics, due to improved dispersibility of the resulting emulsified oil. This improved dispersibility both improves product stability upon standing, and gives smaller emulsion droplet sizes when introduced into an aqueous solution. When sprayed from an agricultural nozzle the formulation comprising the inventive drift control additive decreases the number of very small droplets and provides for a narrower size distribution, with the average being closer to the median value, thereby reducing the number of very large droplets as well.

The drift control additive is suitable for use with any crop chemical which can be applied by spray techniques including, without limit, herbicides, insecticides, fungicides, fertilizers and the like.

The drift control additive can be employed in a solution in a concentration of at least 0.1 wt % to no more than 2 wt %. Below about 0.1 wt % the effect is inferior and above about 2 wt % the cost of additional material is not justified.

EXAMPLES

EXAMPLE 1: In a 1 L flask were combined 300.5 g (1 mole) of 12-hydroxystearic acid and 99.5 g (0.125 mole) of glycerin that had been alkoxylated with 17 moles of ethylene oxide. The reaction was heated to 195 C for 24 hours with a nitrogen sparge while stirring to form the poly(12-hydroxystearic acid) ester of the branched ethoxylate. The product was an amber liquid with an acid value of 5.5.

EXAMPLE 2: To form the complete drift control additive 8.5 grams of the composition of EXAMPLE 1 were blended with 90 grams (0.10 moles) of soybean oil and 1.5 grams ($2.5\times10^{-3}$ moles) of oleic acid that had been reacted with seven moles of ethylene oxide. This blend is referred to herein as Composition 1.

EXAMPLE 3: As a control solution, a gallon of water was blended with a commercial glyphosate potassium salt solution (4 oz) at the rate recommended on the label. This solution was evaluated in a wind tunnel equipped with a laser diffraction system to determine the particle size distribution of the resultant spray. The wind speed was set at 15 mph, the measurement distance from the laser to the spray nozzle was 12 inches, and the spray droplets were characterized using a HELOS KR with R7 lens (Sympatec). When sprayed through a TTI 11004 nozzle at 40 psi, 0.62 percent of the droplet distribution was below 150 μm in diameter. The median particle size was measured to be 744 μm.

EXAMPLE 4: Composition 1, 2 ounces, was added to the control solution described in EXAMPLE 3 forming a dispersed emulsion. When sprayed through the same TTI 11004 nozzle at 40 psi, the average droplet size was found to be 710 μm in diameter, with 0.46 percent of the droplet distribution being below 150 μm in diameter.

EXAMPLE 5. The glyphosate solution described in EXAMPLE 3 was sprayed using a commercial drift control agent based on different chemistry, it was found that 0.67 percent of the droplet size distribution was below 150 μm in diameter. The average particle size was found to be 640 μm in diameter. Similar results were found for multiple commercial drift control products. Their composition is not disclosed.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. An aerosol for spraying crops comprising:
an active component;
ethoxylated polyol comprising at least twelve to no more than twenty-five polymerized 1, 2-ethyleneoxy groups to form an ethoxylated polyol and wherein said ethoxylated polyol is terminated by a fatty acid;
an oil; and
an ethoxylated fatty acid.

2. The aerosol for spraying crops of claim 1 wherein said ethoxylated polyol comprises twelve to twenty moles of said polymerized 1, 2-ethyleneoxy groups.

3. The aerosol for spraying crops of claim 1 wherein said fatty acid is polymerized 12-hydroxystearic acid and said ethoxylated polyol comprises at least two to no more than twelve moles of said polymerized 12-hydroxystearic acid per mole of said ethoxylated polyol.

4. The aerosol for spraying crops of claim 1 wherein said oil is soybean oil.

5. The aerosol for spraying crops of claim 1 wherein said ethoxylated fatty acid is ethoxylated oleic acid.

6. The aerosol for spraying crops of claim 2 wherein said ethoxylated polyol comprises fifteen to nineteen moles of said polymerized 1, 2-ethyleneoxy groups.

7. The aerosol for spraying crops of claim 6 wherein said ethoxylated polyol comprises about seventeen moles of said polymerized 1, 2-ethyleneoxy groups.

8. The aerosol for spraying crops of claim 3 wherein said ethoxylated polyol comprises at least five to no more than nine moles of said polymerized 12-hydroxystearic acid.

9. The aerosol for spraying crops of claim 5 wherein said ethoxylated oleic acid comprises at least six to no more than eight ethoxylates.

10. The aerosol for spraying crops of claim 9 wherein said ethoxylated oleic acid comprises seven ethoxylates.

11. The aerosol for spraying crops of claim 1 wherein said active component is selected from the group consisting of herbicides, insecticides, fungicides, and fertilizers.

* * * * *